(12) United States Patent
Fubuki et al.

(10) Patent No.: US 9,331,557 B2
(45) Date of Patent: May 3, 2016

(54) CLEAVAGE METHOD, ROTOR MANUFACTURING METHOD, AND CLEAVAGE APPARATUS

(75) Inventors: Shingo Fubuki, Nisshin (JP); Tetsuyoshi Fukaya, Tokai (JP); Katsuhiko Tatebe, Seto (JP); Yasushi Nishikuma, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 219 days.

(21) Appl. No.: 14/007,567

(22) PCT Filed: Mar. 31, 2011

(86) PCT No.: PCT/JP2011/058248
§ 371 (c)(1),
(2), (4) Date: Sep. 25, 2013

(87) PCT Pub. No.: WO2012/131988
PCT Pub. Date: Oct. 4, 2012

(65) Prior Publication Data
US 2014/0013582 A1    Jan. 16, 2014

(51) Int. Cl.
| B26F 3/00 | (2006.01) |
| H02K 15/02 | (2006.01) |
| H02K 15/03 | (2006.01) |
| H01F 41/02 | (2006.01) |

(52) U.S. Cl.
CPC ............. *H02K 15/02* (2013.01); *B26F 3/002* (2013.01); *H02K 15/03* (2013.01); *H01F 41/0253* (2013.01); *Y10T 29/49012* (2015.01); *Y10T 83/051* (2015.04); *Y10T 83/7487* (2015.04)

(58) Field of Classification Search
CPC ......... H02K 15/03; H02K 1/276; B26F 3/002
USPC .................................. 29/596–598; 83/36, 452
See application file for complete search history.

(56) References Cited

U.S. PATENT DOCUMENTS

| 5,310,104 A * | 5/1994 | Zaidel .................... B26F 3/002 225/2 |
| 2010/0244608 A1 | 9/2010 | Nakamura et al. |
| 2012/0104064 A1 | 5/2012 | Nishikuma et al. |
| 2012/0125969 A1 | 5/2012 | Nishikuma et al. |
| 2013/0087265 A1* | 4/2013 | Takaichi ............. H01F 41/0253 156/60 |
| 2014/0013582 A1* | 1/2014 | Fubuki .................... B26F 3/002 29/598 |
| 2014/0109392 A1* | 4/2014 | Nishikuma ............ H02K 15/03 29/598 |
| 2015/0034691 A1* | 2/2015 | Takaichi ................ H02K 15/03 225/2 |

FOREIGN PATENT DOCUMENTS

| EP | 2793377 | * 10/2014 |
| EP | 2790305 | * 10/2015 |
| JP | 04-331100 | 11/1992 |
| JP | 06-039630 | 2/1994 |
| JP | 07-040296 | 2/1995 |
| JP | 2002-018797 A | 1/2002 |
| JP | 2004-216729 A | 8/2004 |
| JP | 2009142081 A | 6/2009 |
| JP | 2010-173902 A | 8/2010 |
| JP | 2010-208902 A | 9/2010 |
| WO | 2011/004490 A1 | 1/2011 |
| WO | 2011/013209 A1 | 2/2011 |

* cited by examiner

*Primary Examiner* — Minh Trinh
(74) *Attorney, Agent, or Firm* — Kenyon & Kenyon LLP (57) ABSTRACT

A method for cleaving a plate-shaped workpiece formed with two or more linear recesses into three or more parts includes: a first positioning step of holding the workpiece by a positioning unit in place to position a first linear recess; a first clamping step of clamping one side of the first linear recess by a fixing clamp and the other side by a rotating clamp; a first cleaving step of moving back the positioning unit and rotationally separating the rotating clamp; a second positioning step of releasing the clamps and causing the positioning unit to position a second linear recess; a second clamping step of clamping one side of the second linear recess by the fixing clamp and the other side by the rotating clamp, and a second cleaving step of moving back the positioning unit and rotationally separating the rotating clamp.

4 Claims, 11 Drawing Sheets

| Advance WW (Carry-in ⇒ Cleaving Position) | | | | | | | | | | | | | | | | | | | | | | | | | |
|---|---|---|---|---|---|---|---|---|---|---|---|---|---|---|---|---|---|---|---|---|---|---|---|---|---|
| Clamp WW | | | | | | | | | | | | | | | | | | | | | | | | | |
| Advance WW and Release RR | | | | | | | | | | | | | | | | | | | | | | | | | |
| Cleaving | | | | | | | | | | | | | | | | | | | | | | | | | |
| Release Clamp | | | | | | | | | | | | | | | | | | | | | | | | | |
| Cleavage Returning | | | | | | | | | | | | | | | | | | | | | | | | | |
| Pitch Advance WW | | | | | | | | | | | | | | | | | | | | | | | | | |
| Advance/Return WW (Cleaving Position ⇒ Carry-out) | | | | | | | | | | | | | | | | | | | | | | | | | |
| Carry out WW (Simultaneous Carry-in and -out) | | | | | | | | | | | | | | | | | | | | | | | | | |

WW: Plate-shaped Workpiece
RR: Reference Member

CLEAVAGE METHOD, ROTOR MANUFACTURING METHOD, AND CLEAVAGE APPARATUS

CROSS-REFERENCE TO RELATED APPLICATIONS

This is a national phase application based on the PCT International Patent Application No. PCT/JP2011/058248 filed on Mar. 31, 2011, the entire contents of which are incorporated herein by reference.

TECHNICAL FIELD

The present invention relates to a method for cleaving a plate-shaped workpiece or blank made of a magnetic material formed with a linear recess on its surface so that the plate-shaped workpiece is split along the linear recess.

BACKGROUND ART

In a motor, when a large magnet is directly mounted in a rotor, large eddy current loss is generated in the magnet by a magnetic flux. As a technique to reduce the eddy current loss, conventionally, a large magnet is cleaved or split once into a plurality of magnet parts, these cleaved magnet parts are assembled together again and mounted in a rotor. This can reduce the eddy current loss. In this case, a cleaved face is coated with resin to form a resistance layer to further reduce the eddy current loss.

On the other hand, Patent Document 1 discloses another technique that a straight linear recess is formed on the surface of a plate-shaped workpiece made of a magnetic material or a fragile material such as glass, not magnet, and, both sides of the plate-shaped workpiece are clamped and one side thereof is rotated, thereby cleaving the plate-shaped workpiece along the linear recess.

RELATED ART DOCUMENTS

Patent Documents

Patent Document 1: JP 2002-18797 A

SUMMARY OF INVENTION

Problems To Be Solved By the Invention

However, the technique of Patent Document 1 has the following problems. For example, a rotor of a motor for hybrid vehicle uses a number of magnets to output a large torque. Accordingly, as disclosed in Patent Document 1, in a process of forming a central linear recess in a single plate-shaped workpiece and cleaving this workpiece into two parts, it takes a long work time and also it is necessary to install a number of cleaving equipment, resulting in cost increase. Such a long work time results from that carrying of a plate-shaped workpiece in or out of a cleavage apparatus takes long.

To solve the above problems, when the plate-shaped workpiece is cleaved into three or more parts, the time needed for carry-in and carry-out can be relatively shortened. This leads to a reduction in work time needed for one cleaving operation. The applicant repeatedly carried out various experiments to realize the above purpose.

However, when one plate-shaped workpiece is cleaved into three or more parts, their cleaved faces may rub against each other. Further, when a force generated in a subsequent cleaving work is applied on the cleaved faces, the cleaved face of the plate-shaped workpiece made of the fragile material is depressed or caved in, thus generating powder dust. Therefore, it is not easy to cleave or divide a single plate-shaped workpiece into three or more parts.

The present invention has been made to solve the above problems and has a purpose to provide a rotor manufacturing method (a plate-shaped workpiece cleavage method) capable of cleaving a single plate-shaped workpiece into three or more parts without causing depression or the like in a cleaved face.

Means of Solving the Problems

To achieve the above purpose, one aspect of the invention provides the following configurations.

(1) In a cleavage method for cleaving a plate-shaped workpiece made of a magnetic material formed with linear recesses on a surface, the workpiece being to be cleaved along each of the linear recesses, the linear recesses are formed at two or more positions on the plate-shaped workpiece to cleave the workpiece into three or more parts, the method includes: a first positioning step of holding the plate-shaped workpiece by a positioning means in place in a direction perpendicular to the linear recesses to position a first linear recess of the linear recesses in place; a first clamping step of clamping one side of the first linear recess by a fixing clamp with a predetermined clamping force and clamping the other side by a rotating clamp with a predetermined clamping force while the plate-shaped workpiece is positioned by the positioning means; a first cleaving step of moving back the positioning means and rotationally separating the rotating clamp while maintaining the predetermined clamping force of the rotating clamp; a second positioning step of releasing the fixing clamp and the rotating clamp and causing the positioning means to position a second linear recess in place; a second clamping step of clamping one side of the second linear recess by the fixing clamp with the predetermined clamping force and clamping the other side by the rotating clamp with the predetermined force while the plate-shaped workpiece is positioned by the positioning means, and a second cleaving step of moving back the positioning means and rotationally separating the rotating clamp while maintaining the predetermined clamping force of the rotating clamp, wherein cleaved parts obtained in the first cleaving step and the second cleaving step are held with a cleaved face being abutted against a cleaved face of the plate-shaped workpiece, and the plate-shaped workpiece cleaved into three of more parts is held and carried out with their cleaved faces being abutted against each other.

(2) In the cleavage method described in (1), preferably, a reference member of the positioning means is provided on a side of the rotating clamp and configured to push the plate-shaped workpiece unclamped by the rotating clamp toward the fixing clamp after cleavage.

(4) In the cleavage method described in (1) or (2), preferably, at the same time when the plate-shaped workpiece is held and carried out, another plate-shaped workpiece is carried in.

(5) In one of the methods described in (1), (2), and (4), preferably, the predetermined clamping force of the rotating clamp is transmitted by a rotating body moving about a cleavage center.

(6) Another aspect of the invention provides a rotor manufacturing method including mounting the cleaved parts produced by the cleavage method described in any one of (1), (2), (4), and (5) into a rotor main body of a motor.

(7) Further another aspect of the invention provides a cleavage apparatus to be used in the cleavage method described in (1), (2), (4), and (5), the apparatus being configured to cleave a plate-shaped workpiece made of a magnetic material formed with linear recesses on its surface, the workpiece being to be cleaved along each of the linear recesses, wherein the apparatus includes: positioning means for holding the plate-shaped workpiece in place in a direction perpendicular to the linear recesses to position the linear recess in place; clamping means for clamping one side of the linear recess by a fixing clamp with a predetermined clamping force and clamping the other side by a rotating clamp with a predetermined clamping force while the plate-shaped workpiece is positioned by the positioning means; and cleaving means for moving back the positioning means and rotationally separating the rotating clamp while maintaining the predetermined clamping force of the rotating clamp, wherein cleaved parts obtained in the first cleaving step and the second cleaving step are held with a cleaved face being abutted against a cleaved face of the plate-shaped workpiece, and the plate-shaped workpiece cleaved into three of more parts is held and carried out with their cleaved faces being abutted against each other.

Effects of the Invention

The cleavage method (the rotor manufacturing method) and the cleavage apparatus according to the invention can provide the following operations and effects. According to the above configurations (1), (6), and (7), in a cleavage method (cleavage apparatus) for cleaving a plate-shaped workpiece made of a magnetic material formed with linear recesses on a surface, the workpiece being to be cleaved along each of the linear recesses, the linear recesses are formed at two or more positions on the plate-shaped workpiece to cleave the workpiece into three or more parts, the method includes: a first positioning step of holding the plate-shaped workpiece by a positioning means in place in a direction perpendicular to the linear recesses to position a first linear recess of the linear recesses in place; a first clamping step of clamping one side of the first linear recess by a fixing clamp with a predetermined clamping force and clamping the other side by a rotating clamp with a predetermined clamping force while the plate-shaped workpiece is positioned by the positioning means; a first cleaving step of moving back the positioning means and rotationally separating the rotating clamp while maintaining the predetermined clamping force of the rotating clamp; a second positioning step of releasing the fixing clamp and the rotating clamp and causing the positioning means to position a second linear recess in place; a second clamping step of clamping one side of the second linear recess by the fixing clamp with the predetermined clamping force and clamping the other side by the rotating clamp with the predetermined force while the plate-shaped workpiece is positioned by the positioning means, and a second cleaving step of moving back the positioning means and rotationally separating the rotating clamp while maintaining the predetermined clamping force of the rotating clamp, wherein cleaved parts obtained in the first cleaving step and the second cleaving step are held with a cleaved face being abutted against a cleaved face of the plate-shaped workpiece, and the plate-shaped workpiece cleaved into three of more parts is held and carried out with their cleaved faces being abutted against each other. Accordingly, it is possible to shorten a unit time per one cleaving work including the time needed for carry-in and carry-out of a plate-shaped workpiece. Thus, a cost reduction is achieved. Accordingly, even in a carry-out work, the cleaved faces can be held as being continuously in contact with each other. This allows the cleaved faces to abut each other without rubbing, and thus prevents depression or caving-in of the surfaces of the cleaved faces and the generation of powder dust therefrom.

In the second cleaving step, the cleaved part is clamped by the fixing clamp and a remaining non-cleaved part is clamped by the rotating clamp. Thus, the cleaved part is separated from the rotating clamp. This prevents the cleaved face from rubbing against the surface of the remaining part and avoids the force generated in the second cleaving step from acting on the cleaved face. Accordingly, the surface is not depressed or caved in and no powder dust is generated therefrom.

According to the above configuration (3), in the cleavage method described in (1), a reference member of the positioning means is provided on a side of the rotating clamp and configured to push the plate-shaped workpiece unclamped by the rotating clamp toward the fixing clamp after cleavage. Accordingly, the part to be cleaved on the rotating clamp side can be precisely put in contact with the cleaved part on the fixing clamp side by being guided by the clamp plate of the rotating clamp. Specifically, when the cleaved part and the remaining plate-shaped workpiece are made contact, respective cleaved faces can be abutted against each other without rubbing against each other. This prevents depression or caving-in of the surfaces of the cleaved faces and the generation of powder therefrom.

Furthermore, when the cleaved parts are held with their cleaved faces abutting each other, an accumulated size, i.e., a total length of the cleaved parts is slightly longer than original. This may cause a problem that, when the reference member is placed on the side of the rotating clamp which is a movable side and the follower member is placed on the fixed side, the position of the linear recess can be determined precisely relative to the reference side but cannot be determined relative to the follower side. Specifically, any method other than the present invention could not precisely position the linear recess 12 in the cleavage position.

As the linear recesses are sequentially cut from the fixed side, each cleaved part is stocked on the fixed side and thus the parts can be prevented from scattering in the case of continuous high-speed cleaving. As compared with this, if the cleaved parts are stocked on the movable side, the stability of a high-speed cleaving operation may be deteriorated.

According to the above configurations (4), in the cleavage method described in (1) or (2), the plate-shaped workpiece is held and carried out, and at the same time another plate-shaped workpiece is carried in. Accordingly, even in a carry-out work, the cleaved faces can be held as being continuously in contact with each other. This allows the cleaved faces to abut each other without rubbing, and thus prevents depression or caving-in of the surfaces of the cleaved faces and the generation of powder dust therefrom.

According to the above configuration (5), in the cleavage method described in one of (1), (2), and (4), the predetermined clamping force of the rotating clamp is transmitted by the rotating body moving about a cleavage center. Accordingly, in the cleaving step, a uniform cleaving force can be precisely imparted on a whole line of each of the linear recesses. This enables uniform cleavage along each of the linear recesses and uniformizes the state of each cleaved face. Herein, the whole line of each linear recess represents a continuous valley line at a deepest bottom of each recess.

MODE FOR CARRYING OUT THE INVENTION

A detailed description of a preferred embodiment of a plate-shaped workpiece cleavage method embodying the present invention will now be given referring to the accompanying drawings. FIG. 12 is a front view of a plate-shaped workpiece cleavage apparatus and FIG. 11 is a diagram seen from an arrow A in FIG. 12.

The cleavage apparatus is configured so that a pair of central walls 21 are provided standing at a center and a rotary support shaft 22 is fixed to the central walls 21. The rotary support shaft 22 holds a fixing-clamp link 23 and a rotating-clamp link 33 as shown in FIG. 11 so that the links 23 and 33 are separately rotatable. As shown in FIG. 12, at a left end of the fixing-clamp link 23, a support shaft 25 rotatably supports a cam follower 24. At a left end of the rotating-clamp link 33, even though not appearing in the figure, at a left end of the rotating-clamp link 33, a support shaft 35 rotatably supports a cam follower 34.

On the other hand, a motor bracket 43 is fixed on a base 44. In the motor bracket 43, a motor 42 is fixedly placed. On a drive shaft 45 of the motor 42, a circular cam 40 which is a fixing-clamp driving cam and a circular cam 41 which is a rotating-clamp driving cam are fixedly provided. The circular cams 40 and 41 are rotated together with the drive shaft 45. The cam follower 24 is in contact with a cam surface formed on the outer periphery of the circular cam 40. The cam follower 34 is in contact with a cam surface formed on the outer periphery of the circular cam 41.

Figure 11:
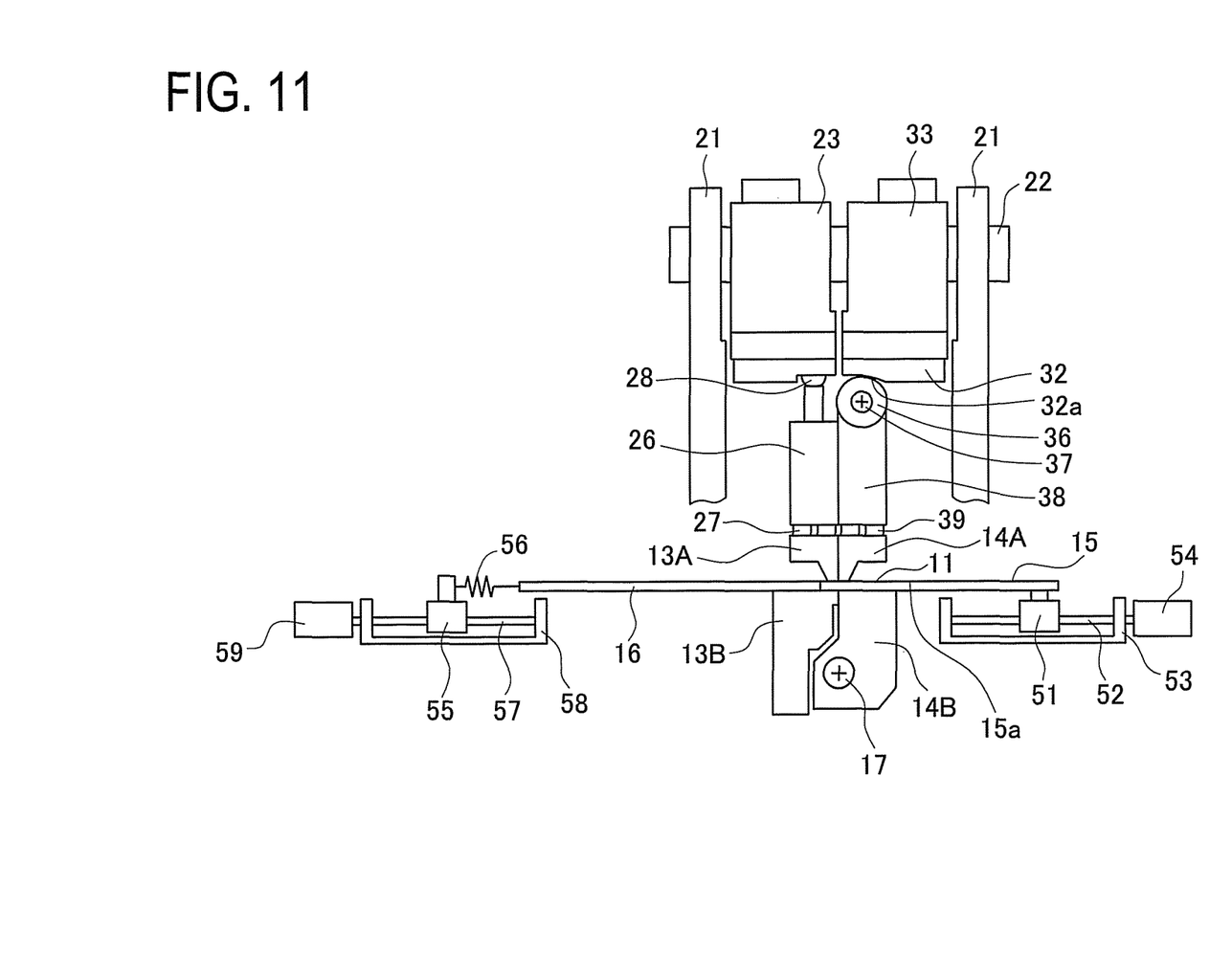
FIG. 11 is a diagram seen from an arrow A in FIG. 7.
Figure 12:
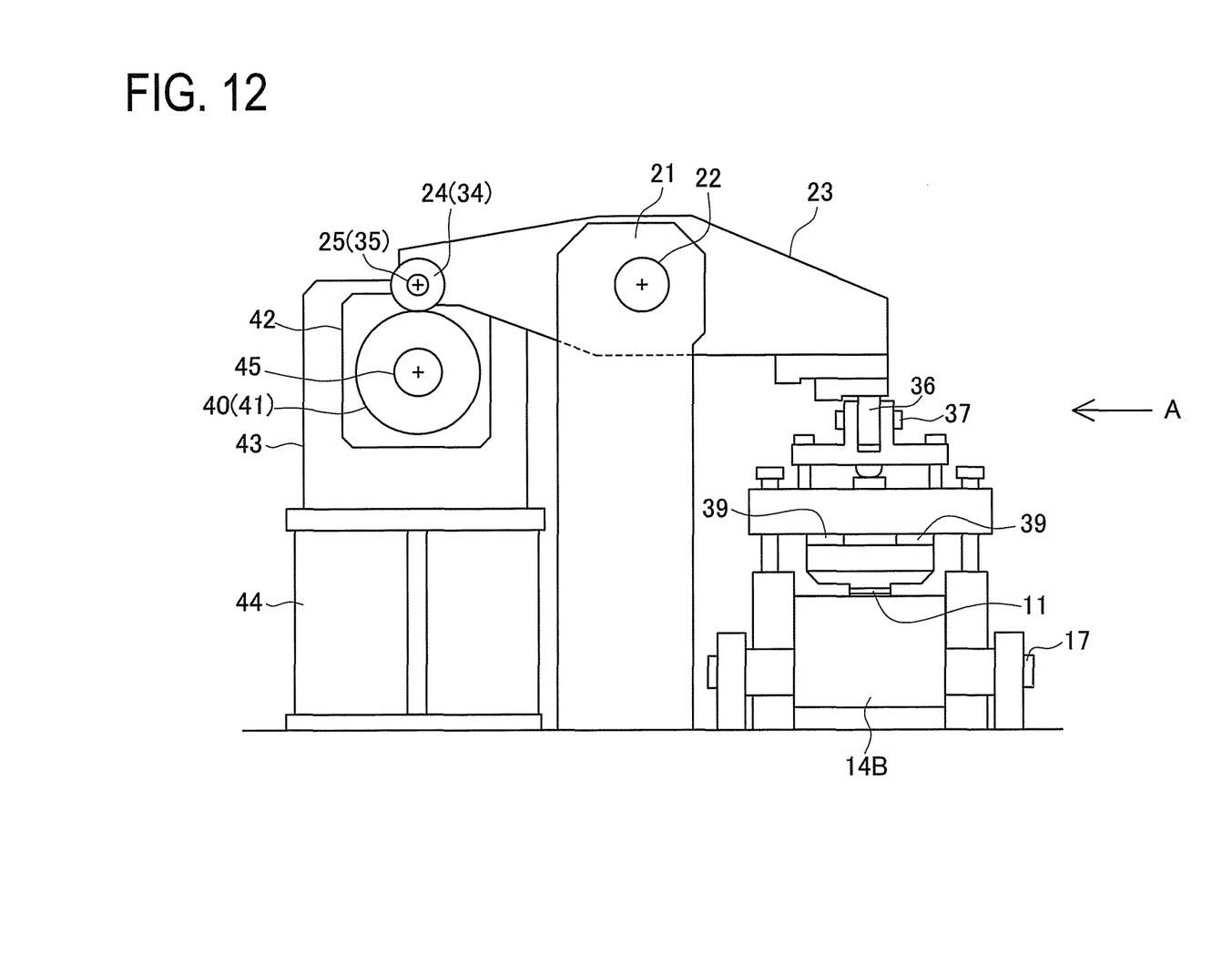
FIG. 12 is a front view of a plate-shaped workpiece cleavage apparatus.

On a lower surface of the right end of the fixing-clamp link 23, as shown in FIG. 11, a pressing member 28 is fixedly provided in contact with a upper surface of a fixed-side member 26. Below the fixed-side member 26, a fixing clamp 13A is provided through a pair of disc springs 27. A lower surface (a clamp surface) of the fixing clamp 13A is configured to clamp a magnetic-material plate-shaped workpiece or blank ("plate workpiece") 11 in cooperation with an upper surface (a clamp surface) of a fixing clamp 13B.

On a lower surface of the rotating-clamp link 33, a curvature cam 32 having a lower surface formed as a cam surface 32a having a curvature is fixed provided. The cam surface 32a of the curvature cam 32 is in contact with the outer peripheral surface of a cam follower 36. This cam follower 36 is rotatably held on a support shaft 37 fixed to a rotary-side member 38. Below the rotary-side member 38, a rotating clamp 14A is provided through a pair of disc springs 39.

A lower surface (a clamp surface) of the rotating clamp 14A is configured to clamp the plate workpiece 11 in cooperation with an upper surface (a clamp surface) of a rotating clamp 14B. The fixing clamp 13B is fixed to a main unit not illustrated. The rotating clamps 14A and 14B are rotatably held on a cleavage support shaft 17 fixed around the cleavage center.

The plate workpiece 11 in the present embodiment is made of a magnetic material (a fragile material) having a width of 50 mm, a length of 30 mm, and a thickness of 3 mm. The surface thereof is formed with three linear recesses, or grooves, 12A, 12B, and 12C by a laser beam. These linear recesses 12 (12A-12C) are minute cutouts, each of which is about 0.1 mm in width and 0.05 mm in depth. The right end face of the plate workpiece 11 is in contact with a reference surface 15a formed in a left end face of the reference member 15. The left end face of the plate workpiece 11 is in contact with a right end face of a follower member 16. The linear recesses 12A, 12B, and 12C are formed relative to the right end face of the plate workpiece 11.

The reference member 15 is fixed to a reference moving table 51. This table 51 is engaged with a ball screw 52 and thus is moved in parallel by rotation of the ball screw 52. The ball screw 52 is rotatably held in a bracket 53. The ball screw 52 is connected to a drive shaft of a servo motor 54 fixed to the bracket 53. Based on a drive amount of the servo motor 54, the reference member 15 is precisely positioned in place.

The follower member 16 is connected to a follower moving table 55 through a compression spring 56. This table 55 is engaged with a ball spring 57 and hence is moved in parallel by rotation of the ball spring 57. The ball screw 57 is rotatably held in a bracket 58. The ball screw 57 is connected to a drive shaft of a servo motor 59 fixed to the bracket 58.

Figure 13:
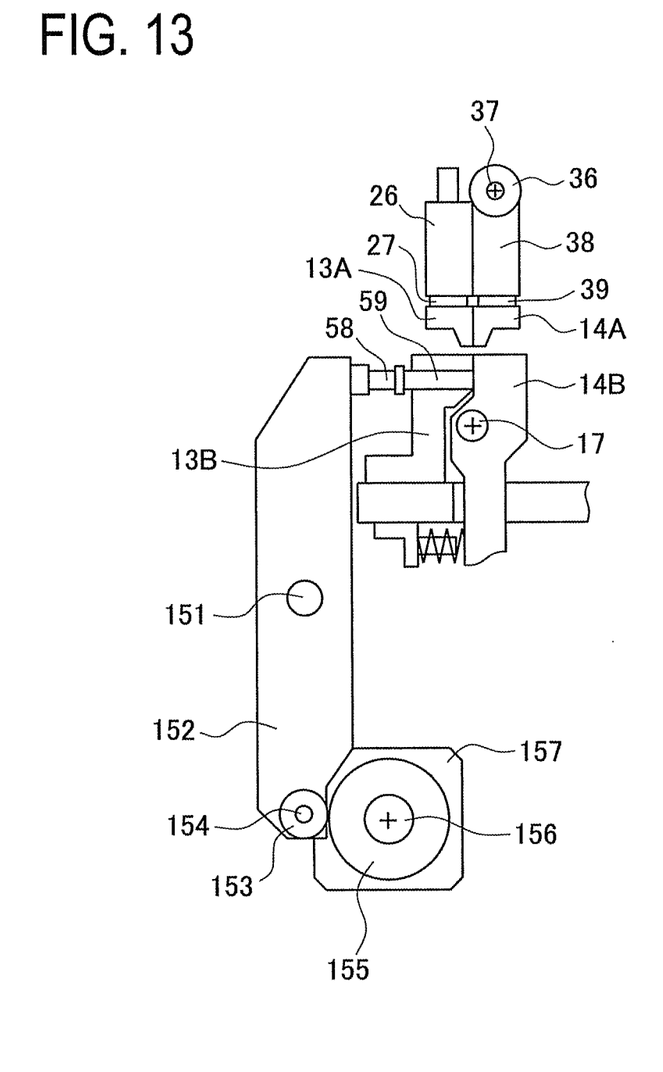
FIG. 13 is a diagram showing a mechanism to rotate a rotating clamp.

FIG. 13 shows a mechanism to rotate the rotating clamps 14A and 14B. In this figure, the fixing clamp 13B and the rotating clamp 14B are differently illustrated in shape from those in FIG. 11 because the clamps 13B and 14B are partly omitted in FIG. 11. Even though FIG. 11 does not disclose, the cam follower 36, rotary-side member 38, disc springs 39, and rotating clamp 14A are attached to the same flat plate (not shown) as well as the rotating clamp 14B so that they are rotated together about the cleavage support shaft 17.

A rotary link 152 is rotatably held on a link support shaft 151 fixed to the main unit. At a lower end of the rotary link 152, a support shaft 154 is fixed, on which a cam follower 153 is rotatably held. The cam follower 153 is in contact with an outer peripheral surface of a circular cam 155. This circular cam 155 is fixed on a drive shaft 156 of a motor 157.

At an upper end of the rotary link 152, a pressing member 158 is fixed. This pressing member 158 presses a sliding member 159 slidably held by the fixing clamp 13B. A front end face of the sliding member 159 is in contact with a left end face of the rotating clamp 14B.

As the circular cam 155 is rotated, the cam follower 153 is rotated clockwise by the circular cam 155, the rotary link 152 is rotated clockwise about the link support shaft 151, moving the sliding member 159 to the right through the pressing member 158, thereby integrally rotating the rotating clamps 14A, 14B, disc springs 39, rotary-side member 38, and cam follower 36 clockwise about the cleavage support shaft 17. At that time, the cam follower 36 is rotated along the cam surface 32a of the curvature cam 32. Thus, a clamping force applied on the rotating clamps 14A and 14B are maintained constant.

Figure 1:
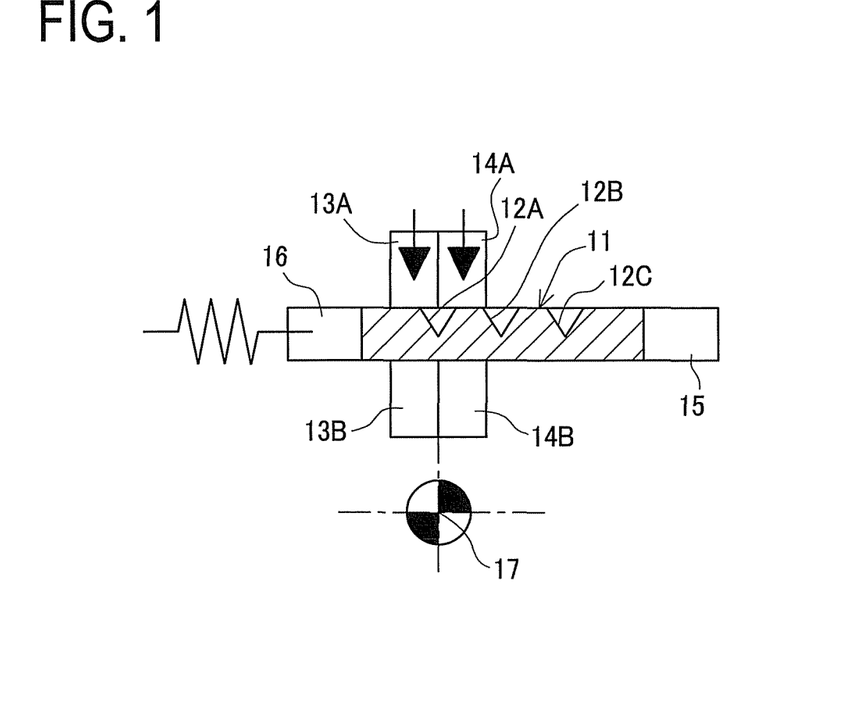
FIG. 1 is a schematic diagram showing a first clamping step.
Figure 14:
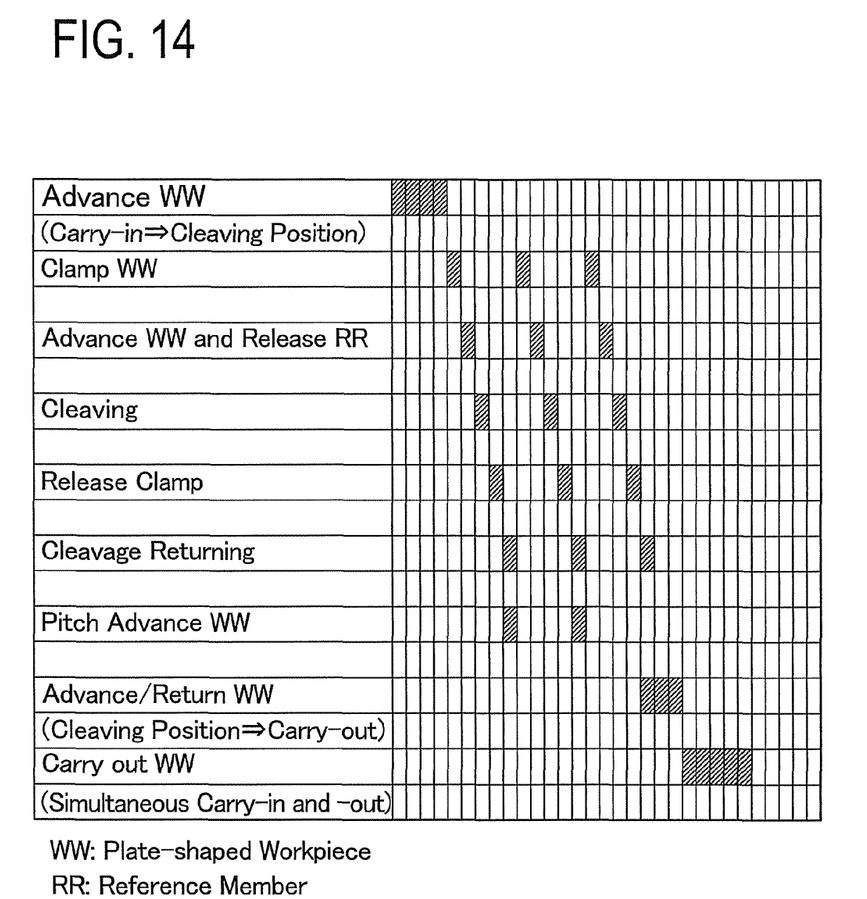
FIG. 14 is an operation flow (a timing chart) showing a cleavage process.

A plate-shaped workpiece cleavage process to be performed using the above plate-shaped workpiece cleavage apparatus will be explained below. FIGS. 1 to 10 show the process, which is schematically illustrated for easy viewing. FIG. 14 is an operation flow diagram of the plate-shaped workpiece cleaving process. FIG. 1 shows a state where both the fixing clamp 13 (13A and 13B) and the rotating clamp 14 (14A and 14B) clamp the plate workpiece 11. This plate workpiece 11 is formed with three parallel linear recesses 12A, 12B, and 12C recessed in a front-to-back direction of the drawing sheet. These linear recesses 12 (12A-12C) are minute cutouts each of which is about 0.1 mm in width and 0.05 mm in depth, but they are illustrated in enlarged size for easy viewing. After cleavage, the actual cutouts are too small to be apparent and thus are not illustrated in the cleaved parts.

As shown in the operation flow diagram (timing chart) in FIG. 14, firstly, the plate workpiece 11 is carried in the plate-shaped workpiece cleavage apparatus and positioned in place. Specifically, prior to a clamping operation in FIG. 1, the reference member 15 is placed in position by the servo motor 54, and the follower member 16 is moved by the servo motor 59 to carry in the plate workpiece 11 and bring the right end face of the plate workpiece 11 into contact with the reference surface 15a of the reference member 15 through the compression spring 56. The plate workpiece 11 is thus positioned in place.

The three linear recesses 12A, 12B, and 12C are formed relative to the right end face of the plate workpiece 11. Thus, the center position of the first linear recess 12A is exactly positioned with respect to the fixing clamps 13A and 13B and the rotating clamps 14A and 14B. In this state, the motor 42 is driven, moving the fixing clamp 13A downward through the circular cam 40, cam follower 24, fixing-clamp link 23, pressing member 28, fixed-side member 26, and disc springs 27, so that the fixing clamps 13A and 13B clamp the plate workpiece 11 from above and below. Simultaneously, the rotating clamp 14A is moved downward through the circular cam 41, cam follower 34, rotating-clamp link 33, curvature cam 32, cam follower 36, rotary-side member 38, and disc springs 39, so that the rotating clamps 14A and 14B clamp the plate workpiece 11 from above and below.

At that time, the magnetic-material plate-shaped workpiece 11 has been positioned in place in such a manner that the reference member 15 is moved leftward to contact with the right end face of the workpiece 11 and move the workpiece 11 to align the center of the first linear recess 12A to a position corresponding to the right side surfaces of the fixing clamps 13A and 13B. Thus, the fixing clamps 13A and 13B are placed in positions nearly contacting with a left edge line of the first linear recess 12A and clamp the left part of the plate workpiece. The rotating clamps 14A and 14B are placed in positions nearly contacting with a right edge line of the first linear recess 12A clamp the right part of the plate workpiece.

Figure 2:
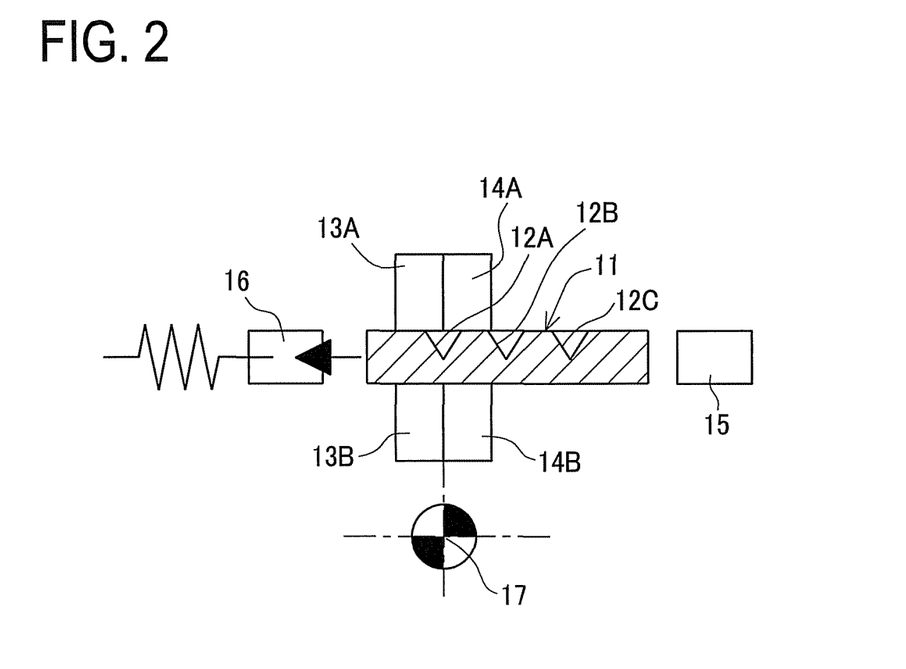
FIG. 2 is a schematic diagram showing a first releasing operation of a reference member and a follower member.

Next, the servo motor 54 is driven to move the reference member 15 rightward as shown in FIG. 2. This amount of movement is determined to bring the reference member 15 to a position that does not contact or touch the rotating right end of the plate workpiece 11 when this workpiece 11 is rotated later. Simultaneously, the servo motor 59 is driven to move the follower member 16 leftward. Herein, the retreating amount distance of the reference member 15 is determined to be minimum, thereby preventing the plate workpiece 11 from excessively swinging.

Figure 3:
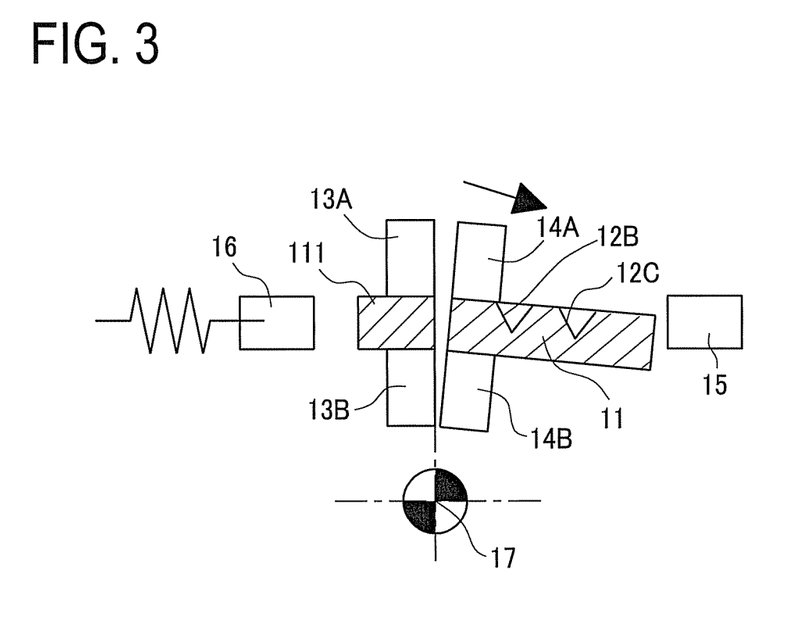
FIG. 3 is a schematic diagram showing a first cleaving operation.

Subsequently, as shown in FIG. 3, a cleaving step is performed. To be concrete, the motor 157 is driven to rotate the circular cam 155. This circular cam 155 causes the cam follower 153 to rotate clockwise. The rotary link 152 is thus rotated clockwise around the link support shaft 151, moving the sliding member 159 rightward through the pressing member 158, thus integrally rotating the rotating clamps 14A and 14B, disc springs 39, rotary-side member 38, and cam follower 36 clockwise around the cleavage support shaft 17.

At that time, the plate workpiece 11 is being clamped, on the left side of the linear recess 12A, by the fixing clamps 13A and 13B with a clamping force of 3 to 4 kN. Thus, the plate workpiece 11 is not pulled and displaced from the fixing clamps 13A and 13B. Furthermore, the plate workpiece 11 is also being clamped, on the right side of the linear recess 12A, by the rotating clamps 14A and 14B with a clamping force of 3 to 4 kN. Accordingly, the plate workpiece 11 is not slipped from the rotating clamps 14A and 14B. The plate workpiece 11 is therefore cleaved along the linear recess 12A.

At that time, since the cam follower 36 is rotated along the cam surface 32a of the curvature cam 32, the clamping force (3 to 4 kN) applied on the rotating clamps 14A and 14B is maintained constant. This enables a stable cleaving operation.

Figure 4:
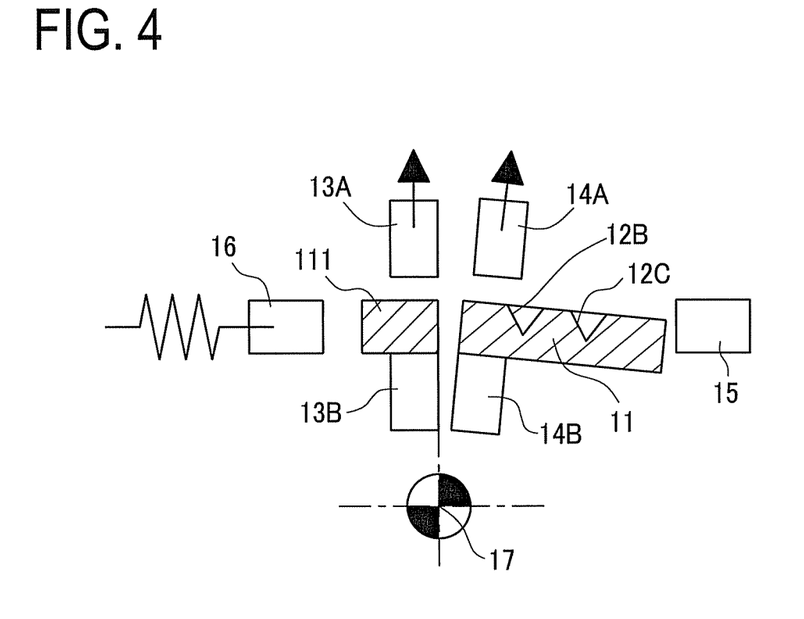
FIG. 4 is a schematic diagram showing a first clamp-releasing operation.

Thereafter, as shown in FIG. 4, the fixing clamp 13A is moved upward to remove the fixing clamping force from the plate workpiece 11. At the same time, the rotating clamp 14A is moved upward to remove the rotating clamping force from the plate workpiece 11.

Figure 5:
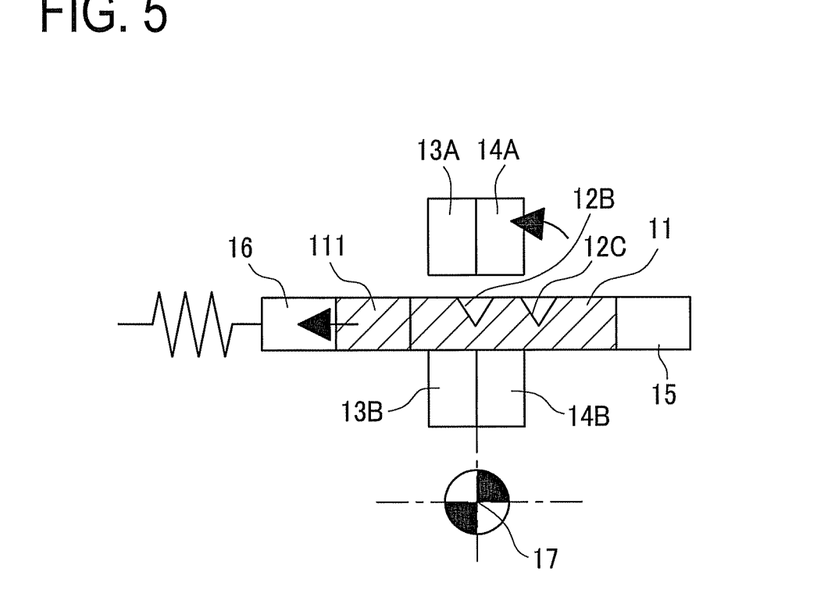
FIG. 5 is a schematic diagram showing a first positioning operation (reference member and follower member)

The reference member 15 is then moved leftward into contact with the right end face of the plate workpiece 11 and further moved until the center of the second linear recess 12B comes to a position corresponding to the right side surfaces of the fixing clamps 13A and 13B as shown in FIG. 5. At the same time, the rotating clamp 14B is rotated counterclockwise. The follower member 16 is allowed to escape, or move back, by the compression spring 56. Thus, the plate workpiece 11 is positioned in place by the reference surface 15a of the reference member 15 so that the center of the second linear recess 12B coincides with the intermediate point between the fixing clamps 13A and 13B and the rotating clamps 14A and 14B. Since positioning of the center of the second linear recess 12B is performed after counterclockwise rotation of the rotating clamp 14B, the plate workpiece 11 can be positioned stably.

The plate workpiece 11 is returned by the reference member 15 while the fixing clamps 13A and 13B and the rotating clamps 14A and 14B are released, or unclamped. Accordingly, a remaining part to be cleaved on the side of the rotating clamps 14A and 14B can be made precisely contact with the cleaved part by being guided by the lower rotating clamp 14B. The cleaved part and the remaining part of the plate workpiece can be made contact so that respective cleaved faces do not rub against each other. Thus, the surface of each cleaved face is prevented from being depressed and generating powder dust.

Figure 6:
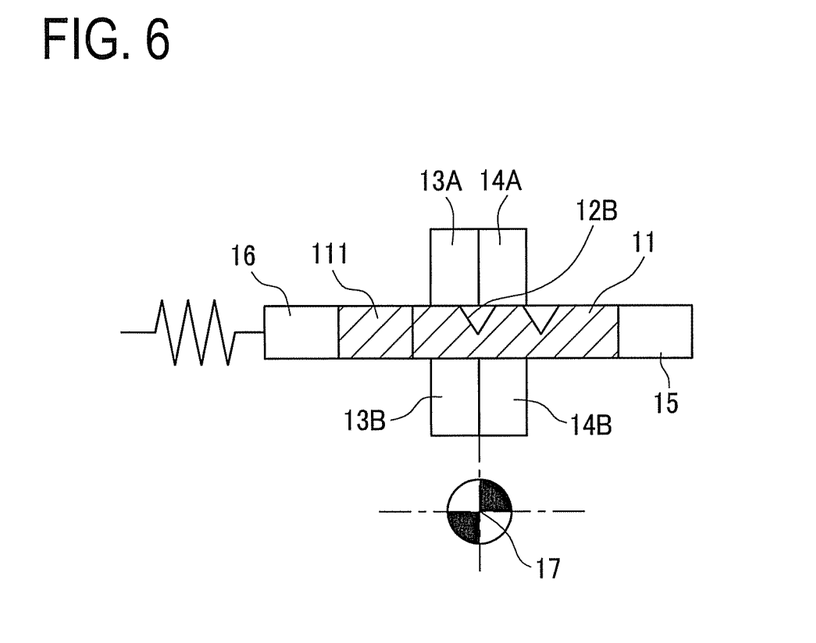
FIG. 6 is a schematic diagram showing a second clamping step.

As shown in FIG. 6 (a second positioning step), the center position of the second linear recess 12B is precisely positioned in place. Specifically, the reference member 15 is moved leftward into contact with the right end face of the plate workpiece 11 and further moved until the center of the first linear recess 12A comes to a position corresponding to the right side surfaces of the fixing clamps 13A and 13B. Thus, the plate workpiece 11 is positioned in place. In this state, the fixing clamps 13A and 13B clamp the plate workpiece 11 from above and below. Simultaneously, the rotating clamp 14A is moved downward, so that the rotating clamps 14A and 14B clamp the plate workpiece 11 from above and below. Herein, a cleaved part 111 is placed on a guide table not shown (not illustrated in FIGS. 1 to 10). At that time, the fixing clamps 13A and 13B placed in close contact with a left edge line of the second linear recess 12B clamp the left part of the plate workpiece. At that time, a clamping force of the fixing clamps 13A and 13B is adjusted to 3 to 4 kN by the pair of disc springs 27. The rotating clamps 14A and 14B placed in close contact with a right edge line of the second linear recess 12B clamp the right part of the plate workpiece. At that time, a clamping force of the rotating clamps 14A and 14B is adjusted to 3 to 4 kN by the pair of disc springs 39.

Figure 7:
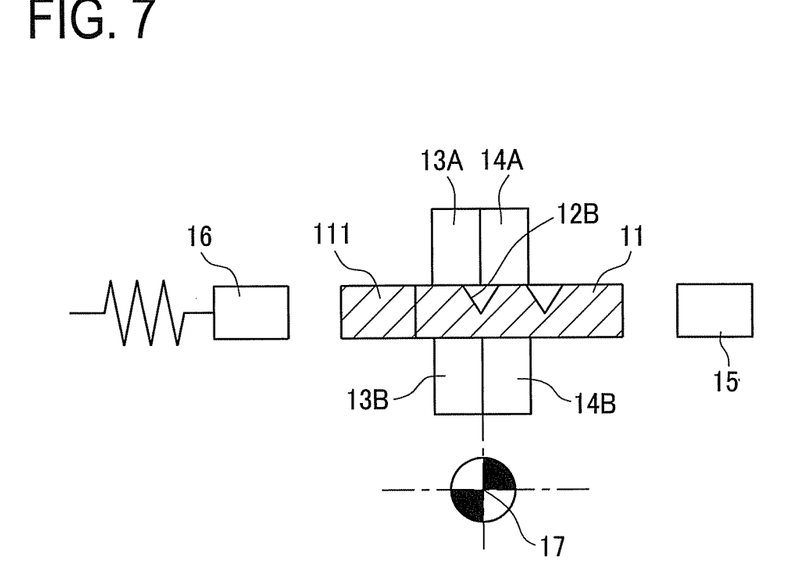
FIG. 7 is a schematic diagram showing a second releasing operation of a reference member and a follower member.

Subsequently, as shown in FIG. 7 (a second releasing step of a reference member and a follower member), the reference member 15 is moved rightward and the follower member 16 is moved leftward.

Figure 8:
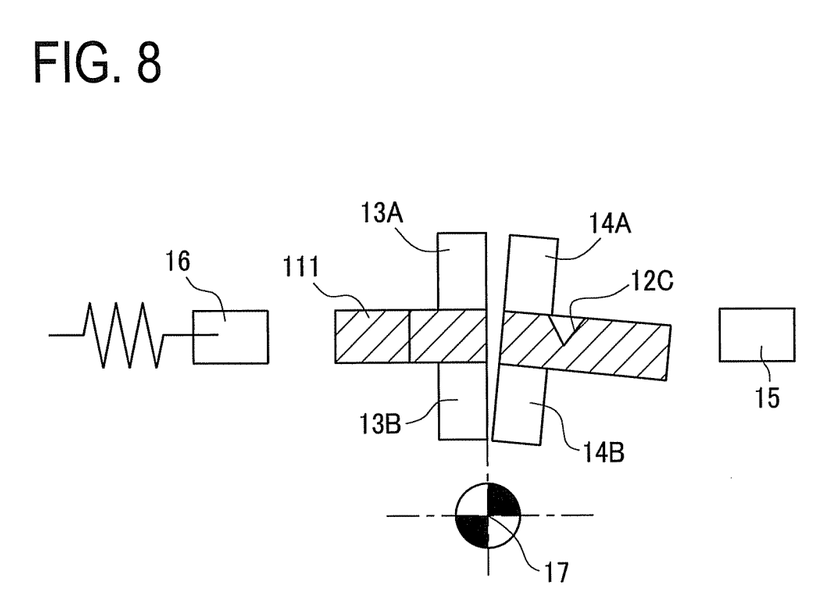
FIG. 8 is a schematic diagram showing a second cleaving operation.

A second cleaving step is then performed as shown in FIG. 8. Specifically, the rotating clamps 14B and 14A, disc springs 39, rotary-side member 38, and cam follower 36 are integrally rotated clockwise about the cleavage support shaft 17. Thus cleavage is performed.

At that time, the plate workpiece 11 is being clamped, on the left side of the linear recess 12B, by the fixing clamps 13A and 13B with a clamping force of 3 to 4 kN. Accordingly, the plate workpiece 11 is not pulled and displaced from the fixing clamps 13A and 13B. The plate workpiece 11 is also being clamped, on the right side of the linear recess 12B, by the rotating clamps 14A and 14B with a clamping force of 3 to 4 kN. The plate workpiece 11 is not slipped from the rotating clamps 14A and 14B. The plate workpiece 11 is therefore cleaved along the linear recess 12B.

At that time, since the cam follower 36 is rotated along the cam surface 32a of the curvature cam 32, the clamping force applied on the rotating clamps 14A and 14B is maintained constant. This enables a stable cleaving operation.

Figure 9:
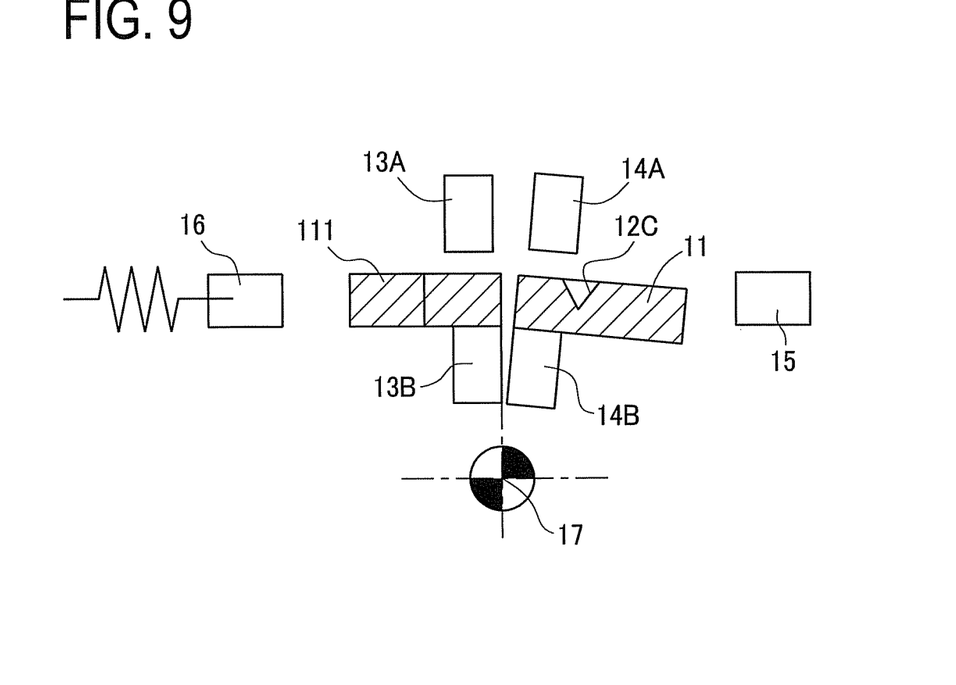
FIG. 9 is a schematic diagram showing a second clamp-releasing operation.

Thereafter, as shown in FIG. 9, the fixing clamp 13A is moved upward to remove the fixing clamping force from the plate workpiece 11. At the same time, the rotating clamp 14A is moved upward to remove the rotating clamping force from the plate workpiece 11.

Figure 10:
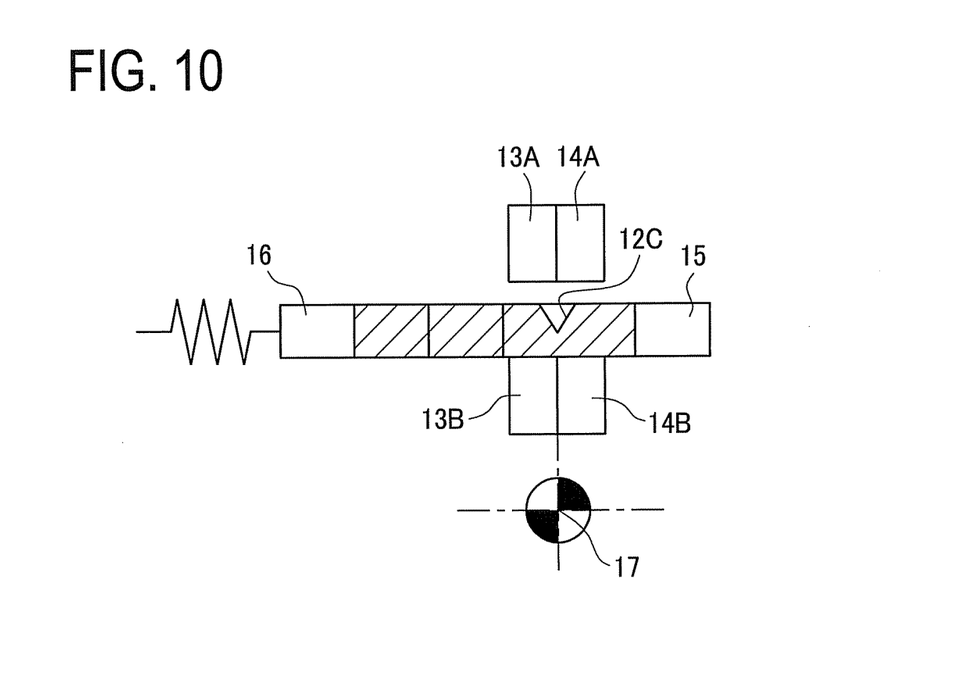
FIG. 10 is a schematic diagram showing a second positioning operation (reference member and follower member)

The reference member 15 is then moved leftward into contact with the right end face of the plate workpiece 11 and further moved until the center of the third linear recess 12C comes to a position corresponding to the right side surfaces of the fixing clamps 13A and 13B as shown in FIG. 10. At that time, the rotating clamp 14B is rotated counterclockwise. The follower member 16 is allowed to escape, or move back, by the compression spring 56. Thus, the plate workpiece 11 is positioned in place by the reference surface 15a of the reference member 15 so that the center of the third linear recess 12C coincides with the intermediate point between the fixing clamps 13A and 13B and the rotating clamps 14A and 14B.

The clamping operation in FIG. 1, the releasing operation of the reference member 15 and the follower member 16 in FIG. 2, the cleaving operation in FIG. 3, the clamp-releasing operation in FIG. 4, and the positioning operation in FIG. 5 are repeated again. Since the plate workpiece 11 in the present embodiment includes the linear recesses 12 at three positions, when the cleaving operation is repeated once again, the plate workpiece 11 is cleaved into four parts.

The plate workpiece 11, split at three positions in this embodiment, is integrally held by the reference member 15 and the follower member 16 and carried out just as it is. Thus, the cleaved faces do not rub against each other and caving-in thereof is not caused.

As shown in FIG. 14, a carry-in operation of the plate workpiece 11 takes 0.4 seconds. Each of the clamping operation in FIG. 1, the releasing operation of the reference member 15 and the follower member 16 in FIG. 2, the cleaving operation in FIG. 3, the clamp-releasing operation in FIG. 4, and the positioning operation in FIG. 5 takes 0.1 seconds. Cleaving takes 0.5 seconds per one process. A last of the positioning operation in FIG. 5 is a preparation operation for carrying out the plate workpiece 11 and takes 0.3 seconds. Thereafter, the carry-out operation takes 0.4 seconds.

In the case where carry-in and carry-out is performed every cleaving operation as in a conventional art, the cleaving operation takes 0.5 seconds, the carry-in operation takes 0.4 seconds, and the carry-out operation takes 0.7 seconds, so that a total time of one cleaving step is 1.6 seconds (=0.5+0.4+0.7), On the other hand, in the cleavage process at three positions in the present embodiment, the cleaving operation takes 1.5 seconds (0.5*3), the carry-in operation takes 0.4 seconds, and the carry-out operation takes 0.7 seconds. A total time needed for one cleavage process is 0.87 seconds (=(1.5+0.4+0.7)/3) which is a half the time for one conventional cleavage process. Reducing the cleavage process time per one process by half leads to a reduction in the number of cleaving devices by half and a reduction in cost per one magnet.

Figure 16:
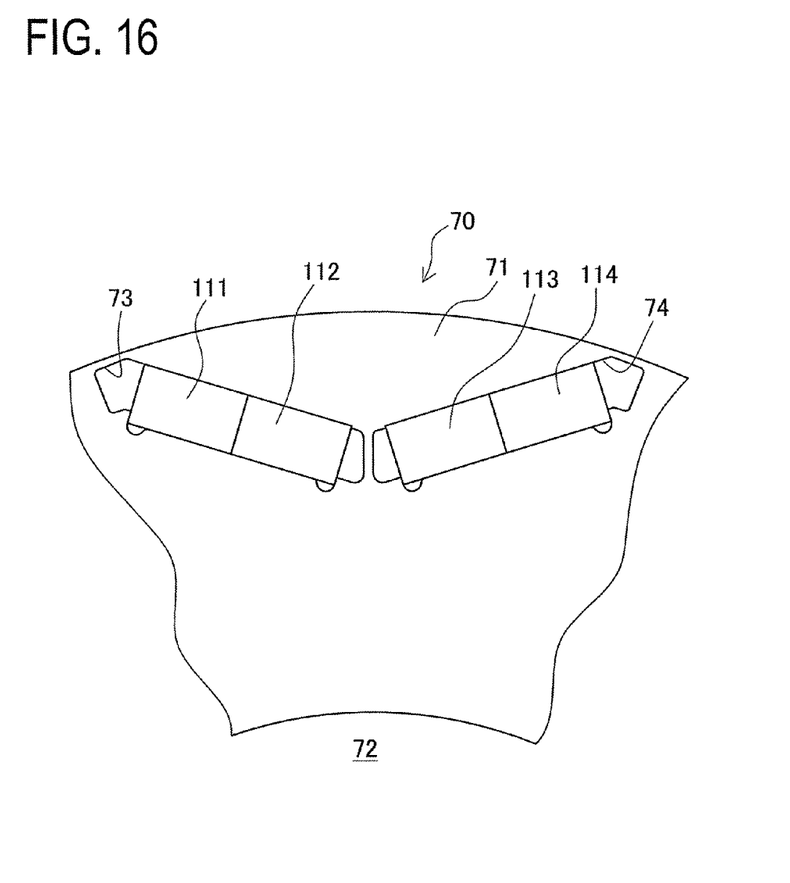
FIG. 16 is a partial diagram of a rotor in which separated magnet parts are mounted and permanent magnetized.

The following explanation is made on how to mount or load the cleaved magnetic parts 111, 112, 113, and 114 in a rotor 70. As shown in FIG. 16, the rotor 70 is formed with a rotor shaft 72 at the center of a rotor main body 71. Near the outer periphery of the rotor main body 71, magnet mounting holes 74 and 73 are formed to receive magnet materials. In the mounting hole 73, the cleaved magnetic parts 111 and 112 are loaded so that their cleaved faces abut against each other. In the mounting hole 74, the cleaved magnetic parts 113 and 114 are loaded so that their cleaved faces abut against each other. The cleaved faces to be placed in abutting relation may be formed or not formed with an insulation film.

After the magnetic parts 111, 112, 113, and 114 and others are mounted and fixed in the rotor main body 71, a strong magnetic field is imparted thereto to permanent magnetize the magnetic parts. The rotor 70 is thus completed. Since the cleaved faces are formed and abutted against each other, even when a magnetic flux from a stator acts on the magnets, an eddy current generated in the magnets can be decreased. This can reduce eddy current loss.

According to the cleavage method in the present embodiment, as explained in detail above, (1) in the cleavage method for cleaving the magnetic-material plate-shaped workpiece 11 along each linear recess 12 formed on the surface of the workpiece 11, the plate workpiece 11 is formed with the linear recesses 12 at two or more positions and the workpiece 11 is cleaved into three or more parts, the method includes: the first positioning step of holding the plate workpiece 11 between the reference member 15 and the follower member 16 in a direction perpendicular to the linear recess 12 and positioning the first linear recess 12A in place, a first clamping step of clamping one side of the first linear recess 12A by the fixing clamps 13A and 13B with a predetermined clamping force (3 to 4 kN) and clamping the other side by the rotating clamps 14A and 14B with a predetermined clamping force (3 to 4 kN) while the plate workpiece 11 is being positioned in place by the reference member 15 and the follower member 16, a first cleaving step of moving the reference member 15 and the follower member 16 back and then rotationally separating the rotating clamps 14A and 14B while maintaining the predetermined clamping force (3 to 4 kN), a second positioning step of releasing the fixing clamps 13A and 13B and the rotating clamps 14A and 14B and positioning the second linear recess in place by a positioning means, a second clamping step of clamping one side of the second linear recess 12B by the fixing clamps 13A and 13B with a predetermined clamping force (3 to 4 kN) and clamping the other side by the rotating clamps 14A and 14B with a predetermined clamping force (3 to 4 kN) while the plate workpiece 11 is positioned in place by the reference member 15 and the follower member 16, and a second cleaving step of moving the reference member 15 and the follower member 16 back and then rotationally separating the rotating clamps 14A and 14B while maintaining the predetermined clamping force (3 to 4 kN). Accordingly, it is possible to shorten a unit time per one cleaving work including the time needed for carry-in and carry-out of the plate workpiece 11. This can achieve a cost reduction.

In the second cleaving step, the cleaved part is clamped by the fixing clamps 13A and 13B and a remaining, non-cleaved, part is clamped by the rotating clamps 14A and 14B. Thus, the cleaved part is separated from the rotating clamps 14A and 14B. Accordingly, the cleaved faces do not rub against each other. The force generated in the second cleaving step is not applied to the cleaved faces. Accordingly, the surfaces are not depressed or caved in and no powder dust is generated therefrom.

(2) In the cleavage method described in (1), the reference member 15 is provided on the side of the rotating clamps 14A and 14B and, after cleavage, the reference member 15 pushes back the magnetic-material plate-shaped workpiece 11 unclamped by the rotating clamps 14A and 14B. Accordingly, a remaining part to be cleaved on the side of the rotating clamps 14A and 14B can be precisely put in contact with a cleaved part on the side of the fixing clamps 13A and 13B by being guided by the lower rotating clamp 14B. Thus, the cleaved part and the remaining part of the plate-shaped workpiece can be put into contact with each other, so that their cleaved faces can be abutted without rubbing against each other. This avoids the surfaces of the cleaved faces from being depressed or caved in and the generation of powder dust therefrom.

Furthermore, in the case where the cleaved parts are held with their cleaved faces being placed in contact, an accumulated size, i.e., a total length of the cleaved parts is slightly longer than original. When the reference member 15 is placed on the side of the rotating clamps 14A and 14B which are on a movable side and the follower member 16 is placed on a fixed side, the position of the linear recess 12 can be precisely determined relative to the reference side but cannot be determined relative to the follower side. Specifically, any method other than the present invention could not precisely position the linear recess 12 in the cleavage position.

As the linear recesses 12 are sequentially cut from the fixed side, each cleaved part is stocked on the fixed side and thus the parts can be prevented from scattering in the case of continuous high-speed cleaving. As compared with this, if the cleaved parts are stocked on the movable side, the stability of a high-speed cleaving operation may be deteriorated.

(3) In the cleavage method described in (1) or (2), after the magnetic-material plate-shaped workpiece 11 is cleaved into three or more parts, the plate workpiece 11 is held and carried out with the cleaved faces of the cleaved parts are abutted against each other, and simultaneously another magnetic-material plate-shaped workpiece 11 is carried in. Accordingly, even in a carry-out work, the cleaved faces can be held as being continuously in contact with each other. This allows the cleaved faces to abut each other without rubbing, and thus prevents depression or caving-in of the surfaces of the cleaved faces and the generation of powder dust therefrom.

(4) In the cleavage method described in any one of (1) to (3), the predetermined clamping force (3 to 4 kN) of the rotating clamps 14A and 14B is transmitted by the rotating body moving about the cleavage center. In the cleaving step, a uniform cleaving force can be precisely imparted on the whole line of each of the linear recesses 12. This enables uniform cleavage along each of the linear recesses 12 and uniformizes the state of each cleaved face.

A second embodiment of the plate-shaped workpiece cleavage method according to the invention will be explained below. The details of this embodiment are almost similar to those of the first embodiment and thus similar or identical parts are not explained. Differences from the first embodiment are thus explained in detail below.

Figure 15:
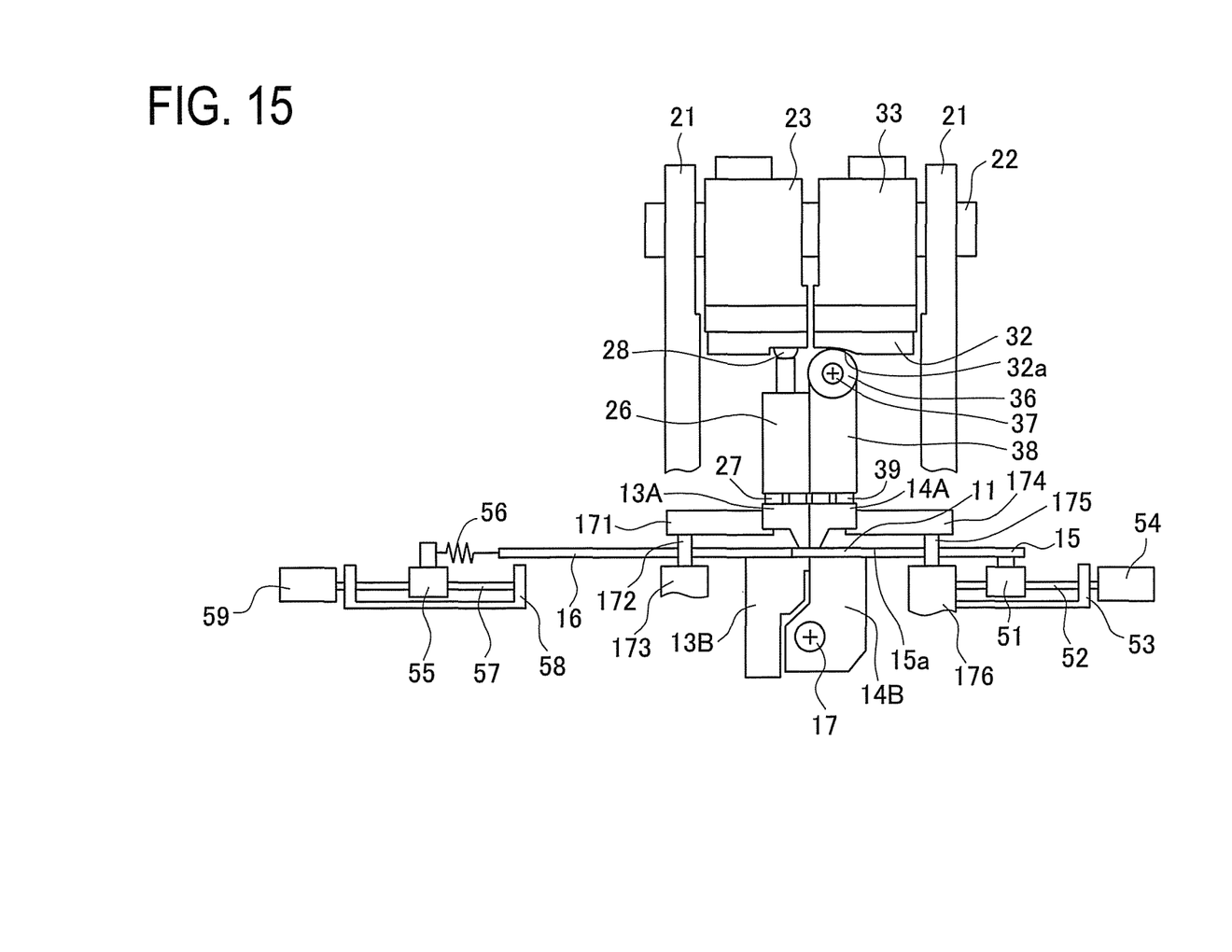
FIG. 15 is a diagram in a second embodiment corresponding to FIG. 11.

FIG. 15 is a diagram corresponding to FIG. 11. As shown in FIG. 15, the fixing clamp 13A is connected to a backup member 171. Under a lower surface of a left end portion of the backup member 171, a support shaft 172 is placed in contact with an upper surface of a base 173. Similarly, the rotating clamp 14A is connected to a backup member 174. Under a lower surface of a right end portion of the backup member 174, a support shaft 175 is placed in contact with an upper surface of a base 176.

Comparing with the fixed-side member 26, a clamping portion of the fixing clamp 13A is located toward the right. Accordingly, when the fixing clamp 13A is pressed with a strong force as high as 3 to 4 kN, it may be tilted in a counterclockwise direction. Thus, the presence of the backup member 171, support shaft 172, and base 173 can prevent the fixing clamp 13A from tilting even when a strong force acts on the fixing clamp 13A. The fixing clamp 13A can therefore clamp the magnetic-material plate-shaped workpiece 11 with a uniform force. Comparing with the rotary-side member 38, similarly, a clamping portion of the rotating clamp 14A is located toward the left. Accordingly, when the rotating clamp 14A is pressed with a strong force as high as 3 to 4 kN, it may be tilted in a clockwise direction. Thus, the presence of the backup member 174, support shaft 175, and base 176 can prevent the rotating clamp 14A from tilting even when a strong force acts on the rotating clamp 14A. The rotating clamp 14A can therefore clamp the plate workpiece 11 with a uniform force. As above, in the cleaving step, a stable cleaving operation can be implemented.

The invention is explained in detail in the above embodiments but is not limited thereto. The invention may be embodied in other specific forms without departing from the essential characteristics thereof.

For instance, although the above embodiments show that the linear recesses are formed at three positions and the plate-shaped workpiece is cleaved along each linear recess to produce four parts. As an alternative, the linear recesses may be formed at seven positions for example so that the plate-shaped workpiece is cleaved along each linear recess to produce eight parts. More linear recesses may also be formed.

Furthermore, even though not provided in the above embodiments, an anti-scattering cover and an anti-scattering roller may be additionally provided.

In the above embodiments, cleavage returning and advancing positioning of the magnetic-material plate-shaped workpiece 11 are simultaneously performed. As an alternative, it is possible to perform advance positioning of the magnetic-material plate-shaped workpiece 11 after cleavage returning is terminated.

INDUSTRIAL APPLICABILITY

The present invention relates to a method for cleaving a magnetic-material plate-shaped workpiece which is a part of a motor to be used in a hybrid car, and a rotor manufacturing method.

REFERENCE SIGNS LIST

11 Magnetic-material plate-shaped workpiece
12A First linear recess
12B Second linear recess
12C Third linear recess
13A, 13B Fixing clamp
14A, 14B Rotating clamp
17 Cleavage support shaft
22 Rotary support shaft
23 Fixing-clamp link
32 Curvature cam
33 Rotating-clamp link
36 Cam follower
15 Reference member
16 Follower member

The invention claimed is:

1. A cleavage method for cleaving a plate-shaped workpiece made of a magnetic material formed with linear recesses on a surface, the workpiece being to be cleaved along each of the linear recesses, wherein
the linear recesses are formed at two or more positions on the plate-shaped workpiece to cleave the workpiece into three or more parts,
the method includes:
providing the workpiece and a cleaver device including a positioning device, a fixing clamp, and a rotating clamp;
a first positioning step of holding the plate-shaped workpiece by the positioning device in place in a direction perpendicular to the linear recesses to position a first linear recess of the linear recesses in place;
a first clamping step of clamping one side of the first linear recess by the fixing clamp with a predetermined clamping force and clamping the other side by the rotating clamp with a predetermined clamping force while the plate-shaped workpiece is positioned by the positioning device;
a first cleaving step of moving back the positioning device and rotationally separating the rotating clamp while maintaining the predetermined clamping force of the rotating clamp to form a cleaved part;
a second positioning step of releasing the fixing clamp and the rotating clamp and causing the positioning device to position a second linear recess in place;
a second clamping step of clamping one side of the second linear recess by the fixing clamp with the predetermined clamping force and clamping the other side by the rotating clamp with the predetermined force while the plate-shaped workpiece is positioned by the positioning device, and
a second cleaving step of moving back the positioning device and rotationally separating the rotating clamp while maintaining the predetermined clamping force of the rotating clamp to form another cleaved part,
wherein the cleaved parts obtained in the first cleaving step and the second cleaving step are held with a cleaved face being abutted against a cleaved face of the plate-shaped workpiece, and
the plate-shaped workpiece cleaved into three of more parts is held and carried out with their cleaved faces being abutted against each other.

2. The cleavage method according to claim 1, further includes:
providing a reference member of the positioning device is provided on a side of the rotating clamp and pushing the plate-shaped workpiece unclamped by the rotating clamp toward the fixing clamp after cleavage.

3. The cleavage method according to claim 1, wherein the predetermined clamping force of the rotating clamp is transmitted by a rotating body moving about a cleavage center.

4. The cleavage method according to claim 1 further includes: holding and carrying out the plate-shaped workpiece, and at the same time, carrying in another plated shaped workpiece.

* * * * *